Aug. 28, 1934.                G. S. CHILES                 1,971,768
                              TRUCK BOLSTER
                         Filed Dec. 10, 1930    7 Sheets-Sheet 1
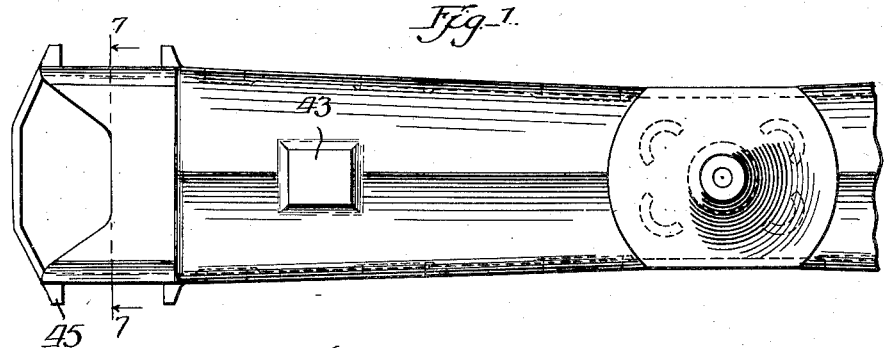
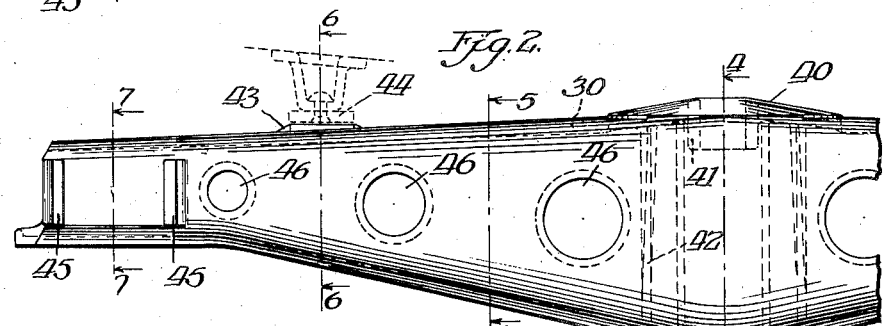
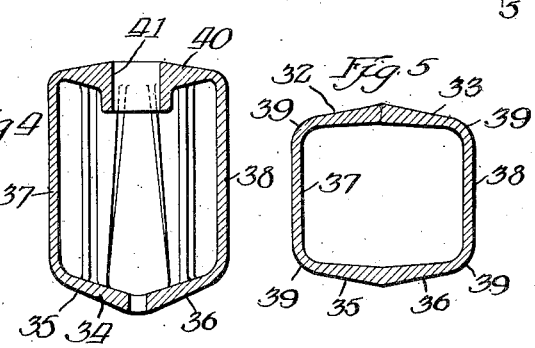
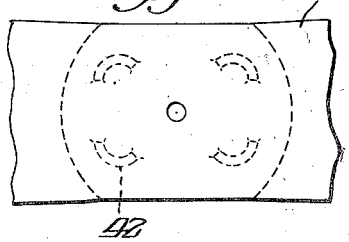
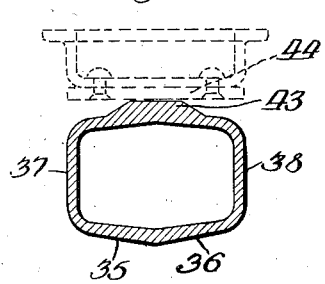
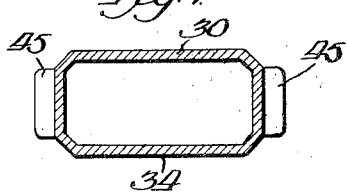
Inventor:
George S. Chiles
By Wilkinson, Shurley, Byron & Knight
Attys
Witness
R. B. Davis Aug. 28, 1934.  G. S. CHILES  1,971,768
TRUCK BOLSTER
Filed Dec. 10, 1930   7 Sheets-Sheet 2
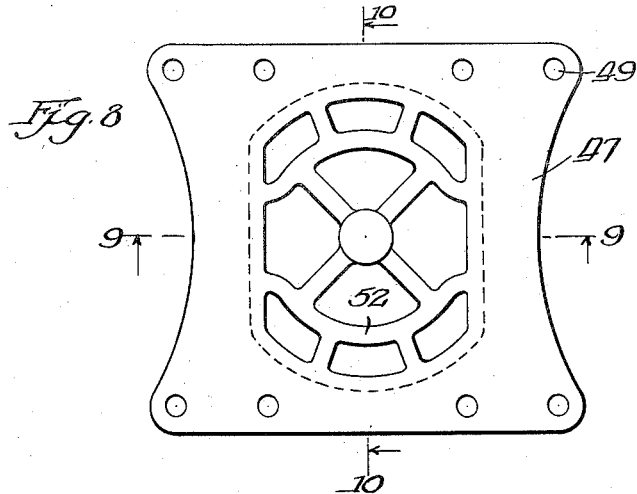
Fig. 8
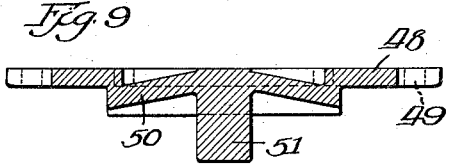
Fig. 9
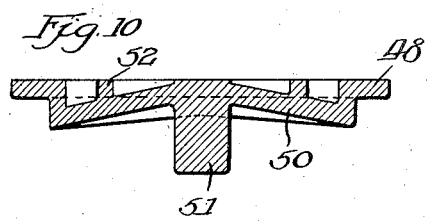
Fig. 10
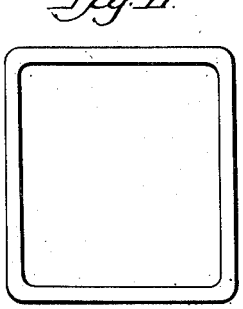   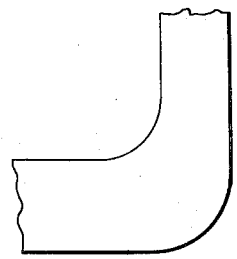   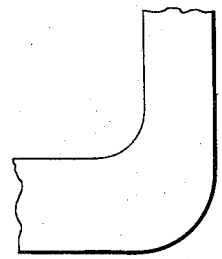
Fig. 11.    Fig. 12.    Fig. 13.
Inventor:
George S. Chiles.
Witness:

Aug. 28, 1934.    G. S. CHILES    1,971,768
TRUCK BOLSTER
Filed Dec. 10, 1930    7 Sheets-Sheet 3
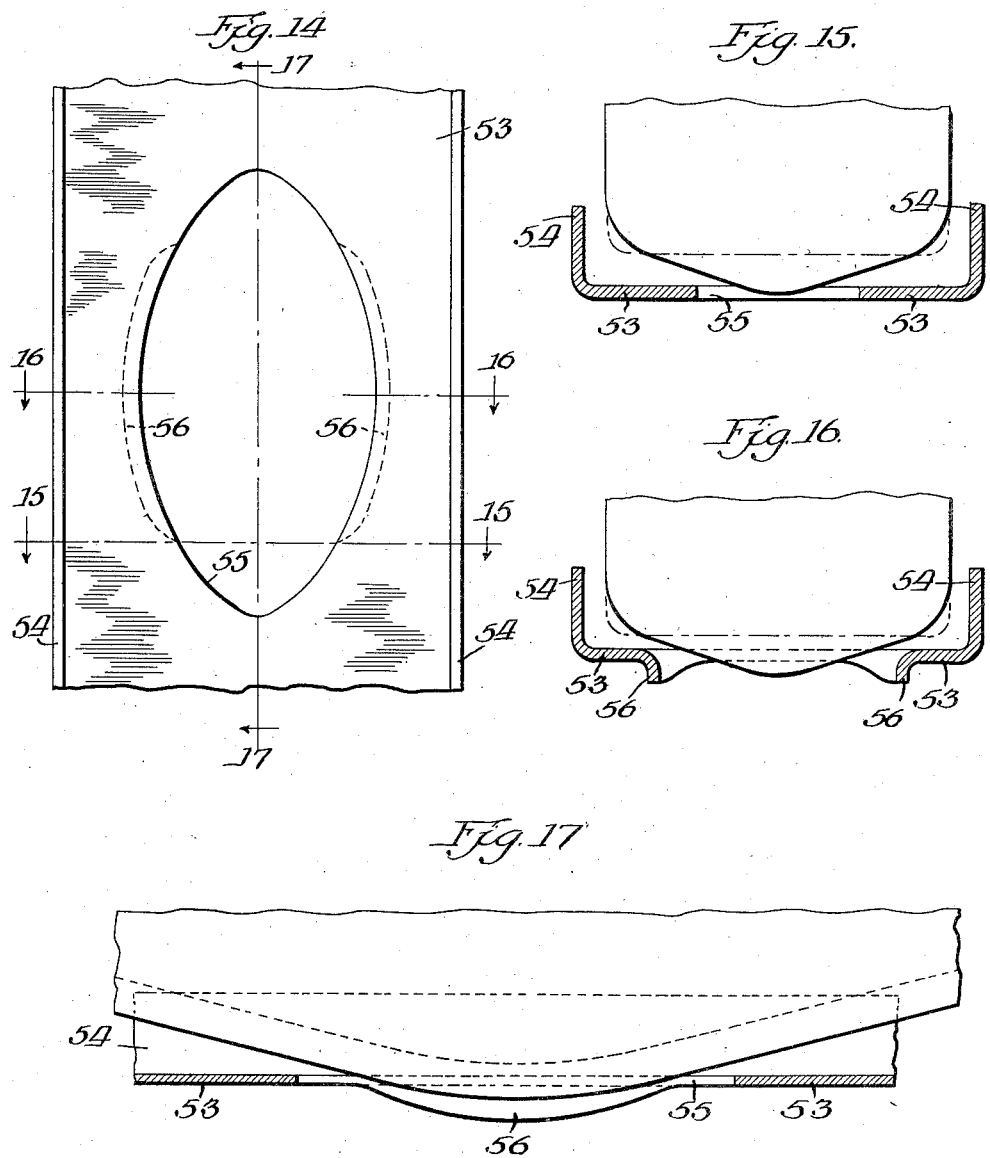

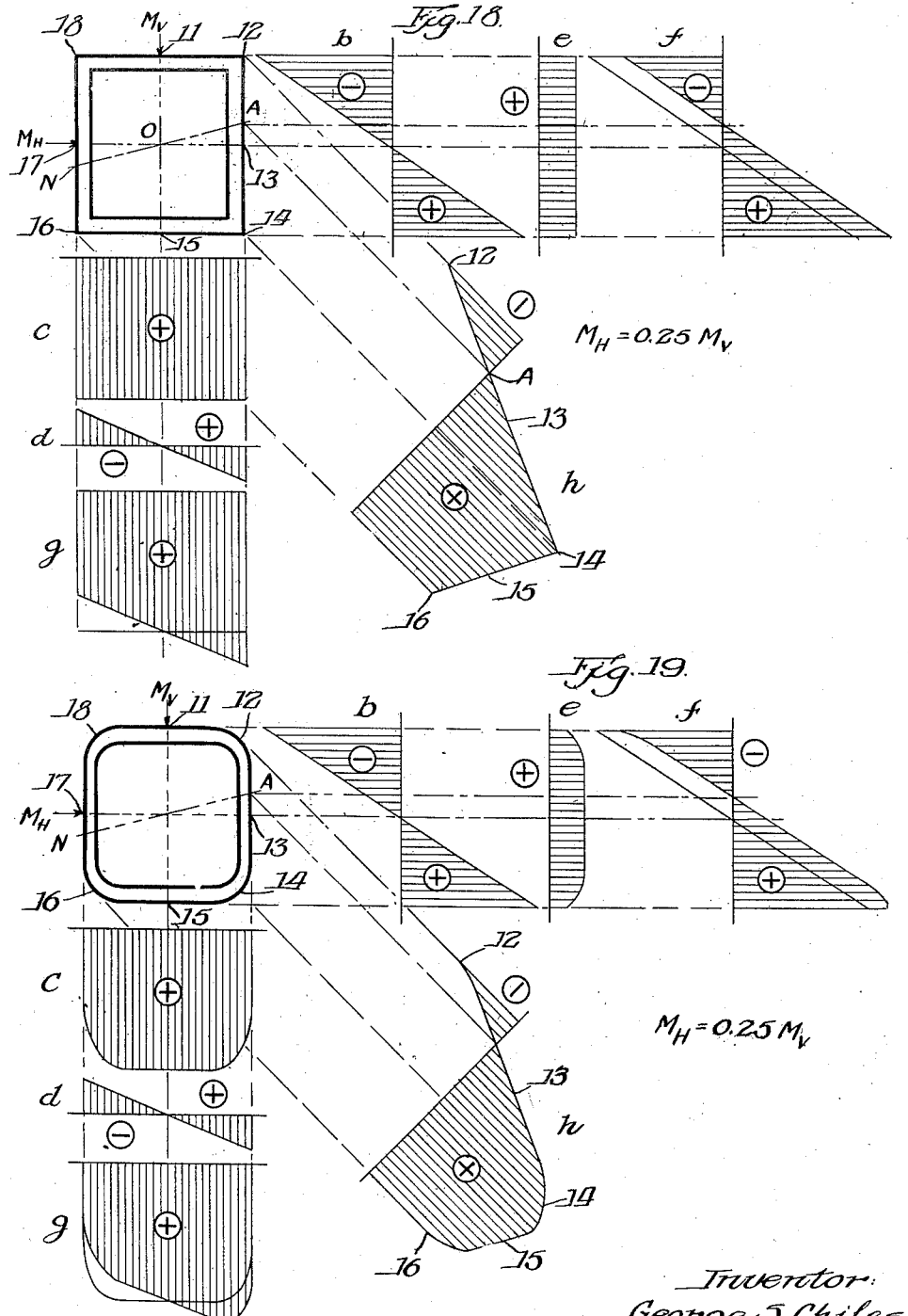

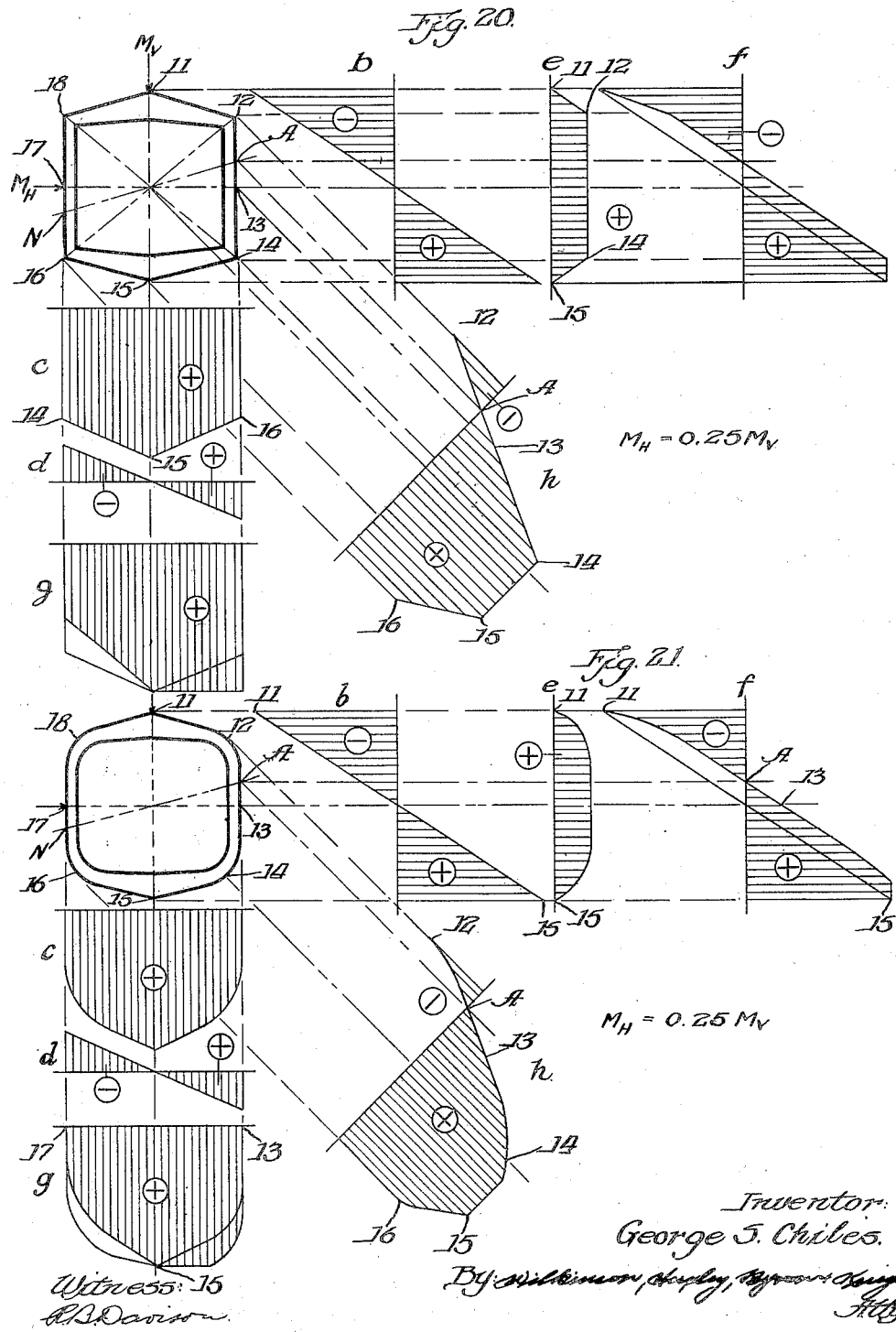

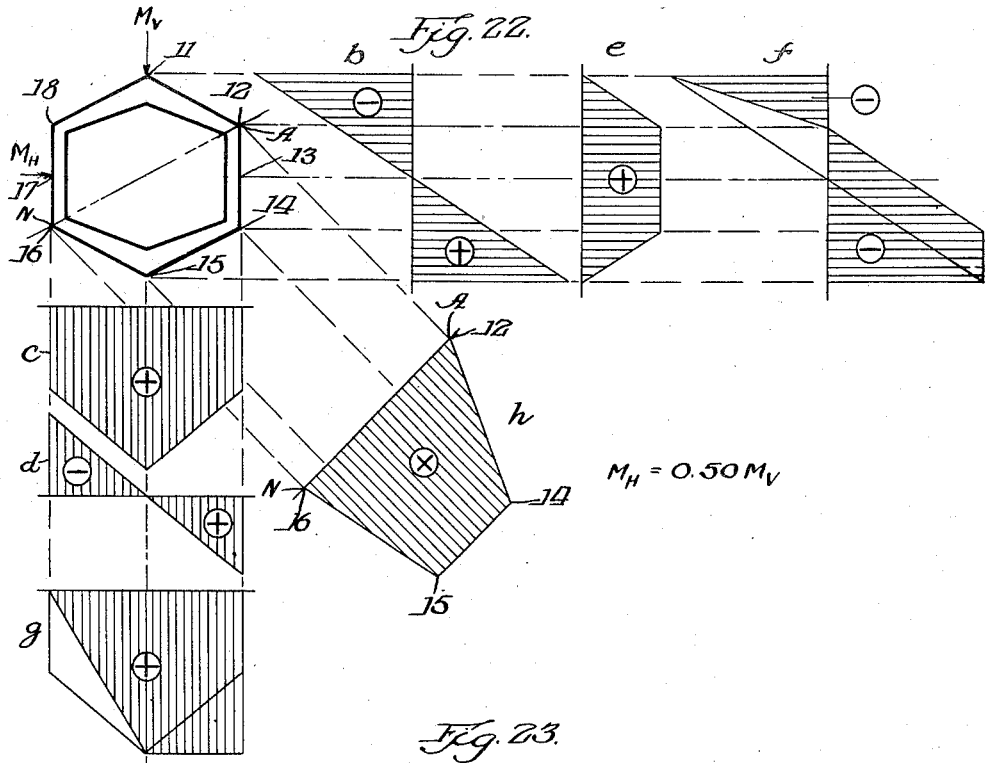
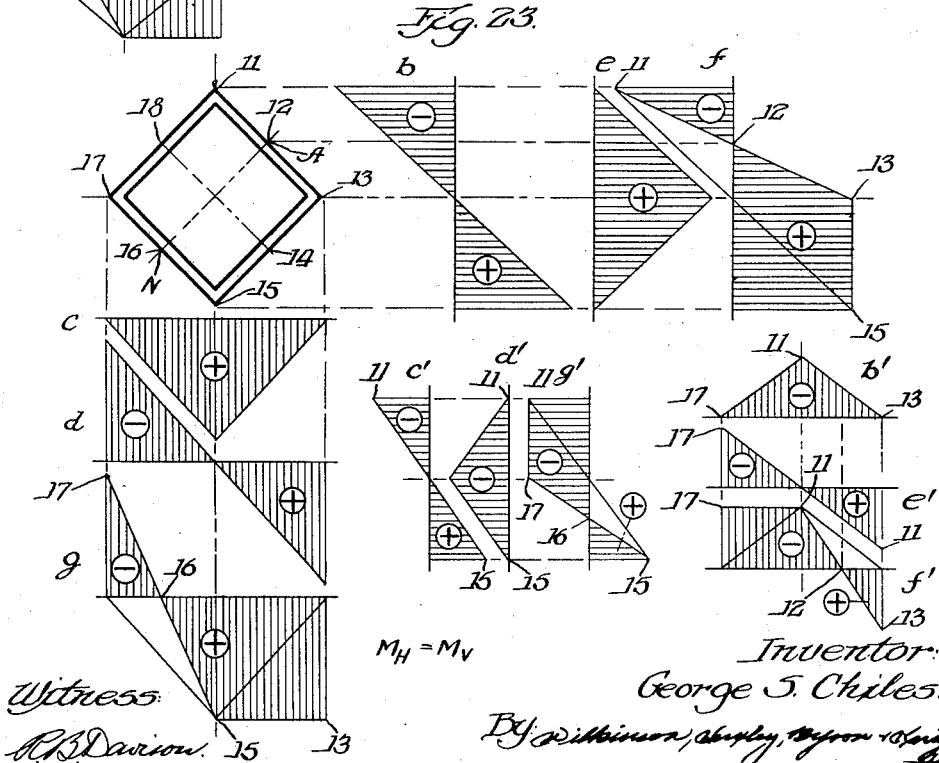

Aug. 28, 1934.   G. S. CHILES   1,971,768
TRUCK BOLSTER
Filed Dec. 10, 1930   7 Sheets-Sheet 7
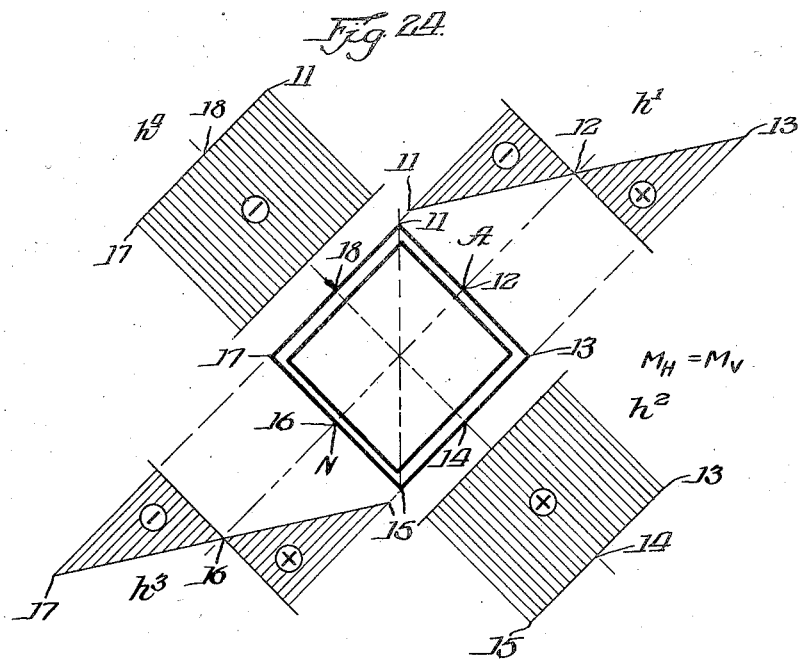
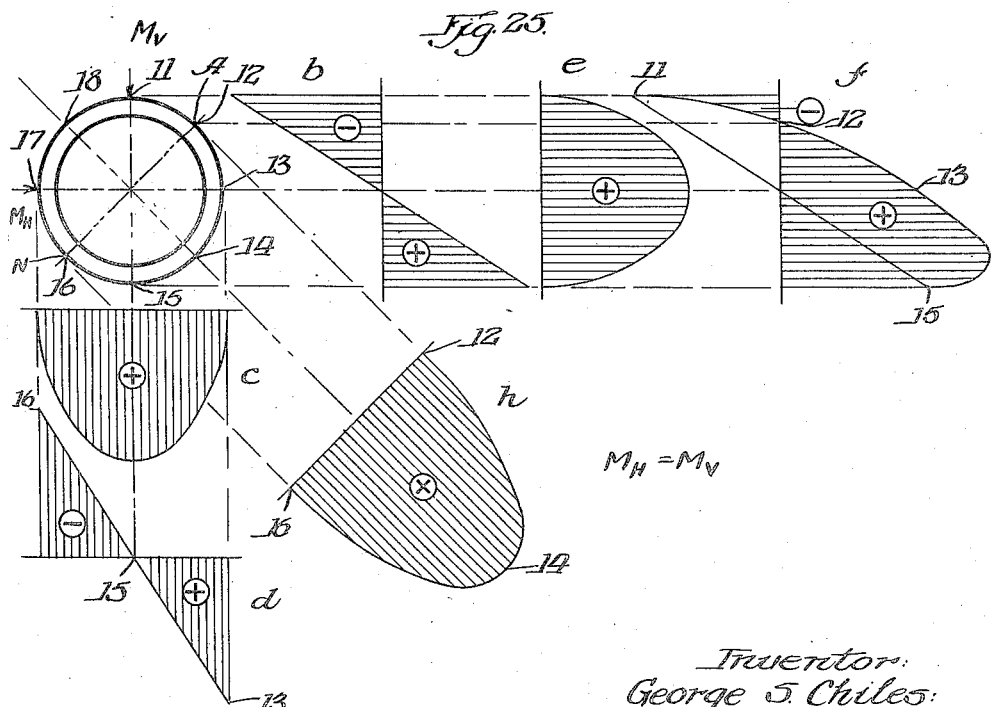

Patented Aug. 28, 1934

1,971,768

UNITED STATES PATENT OFFICE

1,971,768

TRUCK BOLSTER

George S. Chiles, Ashtabula, Ohio, assignor to Scullin Steel Company, St. Louis, Mo., a corporation of Delaware Application December 10, 1930, Serial No. 501,216

8 Claims. (Cl. 105—230)

This invention relates to improvements in truck bolster design and in its broad features is applicable to the design of any beam that is supported at its ends and subjected to simultaneous vertical and horizontal loadings tending to produce direct stress distribution and bending of the beam. The invention is directed to the design of a beam such as a truck bolster in which the exterior outline in cross section of the bolster is such that a more even stress distribution results when the bolster is subjected to simultaneous vertical and horizontal loads.

Truck bolsters as commonly constructed comprise a box-section beam generally square or rectangular in section with the height of the bolster diminishing from the mid-portion to which the loads are applied towards the ends of the bolster. Truck bolsters are subjected to vertical loads consisting of the weight of the car transmitted to the center plate bearing of the bolster, also to a simultaneous horizontal load due to starting, stopping and pulling of the car. The horizontal load may, therefore, be in either of two directions, dependent upon movement of the car. It is found, as will be hereinafter illustrated, that the usual square or rectangular bolster section is not fully efficient since, due to the simultaneous loads, diagonal corners of the bolster are subjected to a much higher stress than the other diagonal corners and the intermediate plane surfaces.

It is a purpose of the present invention to disclose a design of a truck bolster which will be more efficient in stress distribution and may be constructed with a minimum amount of material.

It is an object of the invention to design a truck bolster which may be subjected to an assumed horizontal loading equal to 25% of the assumed vertical loading and which will have a symmetrical six-sided shape in exterior cross sectional outline in which the top and bottom surfaces of the bolster oppositely slope from the center line of the bolster towards the vertical side walls, whereby, upon simultaneous loading, the diagonally-disposed sloping surfaces of the top and bottom of the bolster are subjected to substantially uniform stress distribution.

It is further an object of the present invention to provide a bolster having upper and lower surfaces sloping from the longitudinal center line towards the vertical side walls and having an upwardly directed conical center plate bearing which enables the design of the center plate bearing with a total height less than that required by the customary design of a center plate bearing.

It is further an object of the present invention to provide an improved cooperation between the truck bolster and spring plank in which the spring plank has an opening at its mid-portion which will receive the bottom of the bolster at its midpoint and permit the design of the bolster with a greater height at the center than may be obtained in the usual arrangement.

It is also a feature of the present invention that the bolster is so designed that it is more adaptable to casting since the bolster may be cast on its side due to the oppositely sloping top and bottom walls of the bolster which permit the removal of the bolster casting from the mold and further enables the provision of core-openings only in the side walls of the bolster instead of in the top and bottom walls as required by the present design of bolster which is cast in the position of use.

Further objects and advantages of the present invention will be more readily apparent from the following description taken in connection with the attached drawings in which—

Figure 1 is a fragmentary plan view of an improved bolster design;

Figure 2 is a side elevation of Figure 1;

Figure 3 is a bottom plan view of the center portion of the bolster shown in Figure 1;

Figure 4 is a transverse section of the bolster taken on the plane indicated by 4—4 in Figure 2;

Figure 5 is a transverse section of the bolster taken on a plane indicated by 5—5 in Figure 2;

Figure 6 is a transverse section taken on the plane indicated 6—6 in Figure 2 at the side bearing support;

Figure 7 is a transverse section taken through the end of the bolster taken on a plane indicated 7—7 in Figure 2;

Figure 8 is a top plan view of the body of the center plate;

Figure 9 is a transverse section of the center plate indicated 9—9 in Figure 8;

Figure 10 is a transverse section of the body center plate taken on the plane indicated 10—10 in Figure 8;

Figure 11 is a diagram of the ordinary form of truck bolster, in section;

Figure 12 is an enlarged detail view illustrating a corner portion of the box type bolster shown in Figure 11 drawn to the A. R. A. standard;

Figure 13 is a view similar to Figure 12 drawn to the U. S. R. A. standard;

Figure 14 is a plan view of a spring plank designed for assocation with the improved bolster;

Figure 15 is a transverse section of the spring plank taken on the plane indicated 15—15 in Figure 14 and illustrating in outline a portion of the improved truck bolster while the customary form of truck bolster is indicated in dotted line;

Figure 16 is a transverse section similar to Figure 15 taken on the plane indicated 16—16 in Figure 14;

Figure 17 is a longitudinal section of the spring plank on the plane indicated 17—17 in Figure 14 and showing diagrammatically the outline of a portion of a cooperating truck bolster;

Figure 18 is a graphic diagram illustrating the stress distribution resulting from the simultaneous loadings of a horizontal load equal to 25% of a vertical load applied to a beam section having sharp square corners;

Figure 19 is a similar graphic diagram of stress distribution in a section having rounded square corners;

Figure 20 is a similar graphic diagram of stress distribution in a section having a six-sided shape in exterior outline with sharp corners;

Figure 21 is a graphic diagram similar to Figure 20 in which the corners of the section are rounded;

Figure 22 is a graphic diagram similar to Figure 20 in which the assumed horizontal load is equal to 50% of the assumed vertical load;

Figure 23 is a graphic diagram of stress distribution in a section having a square section which has been turned so that the assumed equal vertical and horizontal loadings are directed diagonally through the section;

Figure 24 is a correlated graphic diagram of combined stress distribution in a section, as in Figure 23, on the four faces thereof, and Figure 25 is a graphic diagram of stress distribution in a cylindrical shaped section.

In order to develop a truck bolster design that will be of the greatest efficiency and most economical in construction, it is necessary to resort to theory to determine the section and especially the exterior outline which should give the best results.

The ordinary type of railway car is supported at its ends by two four-wheel trucks which serve as supports for the car body and each of which must be mounted in such a manner as to permit the truck to revolve slightly relative to the body of the car and thus facilitate travel of the car on curved truck, and therefore some form of pivot construction is required. Provision must also be made for the control of the rocking movement of the car body which may be achieved by means of side bearings spaced at equal distances from the center plate. Each of the truck side bearings cooperates with a co-acting part on a body bolster. The center and side bearings of the bolster must be designed of such substantial construction as to prevent failure from excessive stresses resulting from direct bearing pressures, and also of sufficient area to insure minimum wear. The truck bolsters are subjected to a vertical load normally applied at the center plate, or else partly at the center plate and partly at either side bearing. This load is then delivered at parallel vertical planes near the bolster ends to the truck side frames. The bolster may therefore be considered as a horizontal beam supported at the ends and loaded at its center.

In addition, the bolster must also offer a resistance in a horizontal or transverse direction since the car movement especially when starting and stopping causes horizontal forces to be transmitted to the truck bolster through the body center plate which are finally delivered from the bolster to the truck side frames. These external transverse forces do not act in the same plane. However, they are commonly assumed to be coincident and only the resulting bending action is ordinarily taken into consideration. Considering the external forces as acting in the resistance plane of the bolster, both the vertical and transverse actions induce the ordinary bending and shearing stresses in the two planes incident to the bolster acting as a beam. In order to have equilibrium the resisting moment at any section of the bolster must equal the bending moment at that particular section.

In the following discussion the exterior form, shape or outline of the bolster to resist most efficiently and economically the combined bending actions will be determined. It is most important that a minimum weight in the beam type truck bolster be obtained for a given strength. A steel beam bolster which may be either cast or rolled and in which the metal has substantially the same physical properties in tension as in compression will be considered. For vertical loading only, an I section beam would be the most efficient and would give the minimum weight for a given strength in a single direction. Where the beam is also to be subjected to a horizontal load not applied simultaneously with a vertical load the beam should be a hollow rectangular section. This form of cross-section permits of the most advantageous disposition of the material to resist stresses since the moments of inertia and the section moduli for a given sectional area can be made a maximum for both the vertical and horizontal bending actions. If the bending actions in the two planes are equal, the cross-section should be a hollow square in which the separate loadings in the two directions would each be applied at right angles at one side of the square. If the horizontal and vertical loadings are assumed to be simultaneous, the square section can still be utilized, but it should be located so that the loadings would be applied on the diagonals of the square.

Some years ago when little thought was given to transverse forces developed in truck bolsters, the I section beam was commonly used. Later the T section was resorted to. The present specification calls for bolsters having a transverse strength equal to fifty percent or sometimes one hundred percent of the vertical strength which requires a box section bolster. A cross section of the box type truck bolsters is generally symmetrical about a vertical axis passing through the center of area of a section, and usually is not also symmetrical about a horizontal axis.

In the stress diagrams for the different forms of bolster sections, $M_V$ will refer to the vertical bending moment and $M_H$ to the horizontal bending moment. In the usual form of truck bolster the section is a rectangle which lies substantially parallel and perpendicular to the plane of the outer vertical and horizontal forces, and such a section is shown in Figure 18.

In Figure 18 the corners have been left sharp in order to indicate more clearly the stress distribution. Starting at the point of application of the vertical load, the mid points of each side and the corners are marked as reference points 11 to 18 inclusive. A transverse load $M_H$ will be here assumed to be equal to 0.25 of $M_V$ and to act toward the right at point 17. It will be understood, of course, that the transverse load may act in either direction, but will not act in both directions simultaneously. The transverse load $M_H$ results in tensile stresses on the edge 12, 13, 14 and compression stresses on the edge 16, 17, 18. The stress will vary in direct proportion to its distance from the gravity axis, provided the elastic limit is not exceeded. This is illustrated for the vertical load by diagram $b$ which represents the linear variation of stress upon the edge 12, 13 and 14. From diagram $b$ it will appear that the point 13 will have zero stress due to the vertical load, while point 14 will have the maximum tensile stress and point 12 the maximum compressive stress. Diagram $c$ illustrates the stress distribution along the lower edge 14, 15, 16 due to the vertical load, and it is apparent that there will be a uniform tensile stress along this edge. The transverse load causes resulting bending action inducing bending stresses about a vertical center line 11—15 and the intensity of the transverse bending stress is indicated in diagram $d$ from which it is apparent that the stress is compressive at point 16, decreasing to zero at point 15 and increasing to a maximum of tensile stress at point 14. Diagram $e$ represents similarly the tensile stress along the edge 12, 13, 14 caused by the transverse load. Diagram $f$ combines the stresses along the edge 12, 13, 14 caused by the simultaneously applied vertical and transverse loads. Diagram $g$ similarly combines the stress diagrams $c$ and $d$ for the lower edge 14, 15, 16. In order to clearly illustrate the stress distribution from the point 12 to the point 16, the diagrams $f$ and $g$ may be combined to give the diagram $h$. Diagrams $f$ and $g$ may be readily combined since the first diagram gives a stress value along the edge 12, 14 and the other diagram along the edge 14, 16. If the corners are rounded, the diagrams $f$ and $g$ will overlap for a portion in forming diagram $h$. From this diagram the stress intensities at every point along the vertical right hand edge and the lower edge may be readily compared. The algebraic signs "plus" and "minus" illustrate whether the stress is tensile or compressive. Thus the plus sign indicates tensile stress.

It clearly appears from diagram $h$ that the maximum stress resulting from the combined action of the two loads occurs at the lower right hand corner, or point 14. It is to be understood that point 18 would be of the same stress intensity but of opposite sign to the point 14. The point A on side 12, 13, 14 will be a point of zero stress, and a corresponding point N on side 16, 17, 18 will also be of zero stress. An axis through the points A and N will pass through the center O and will be called the neutral axis.

In Figure 19, there are shown stress diagrams for a bolster section having a square outline with corners rounded to a substantially large radius. The loading is the same as described with reference to Figure 18, that is, the bending moment $M_H$ is equal to 0.25 $M_V$. Similar reference characters are used to indicate the different stress diagrams.

The elimination of the sharp corner is of course preferable in order to secure better castings but the theoretical advantages of the rounded corners are even greater, as will be apparent from a study of the stressed diagrams shown in Figure 19. The variation of the bending moment stress from point 12 to point 14, caused by the vertical loading and illustrated by diagram $b$, is the same as in Figure 18. Diagram $d$ is also the same as diagram $d$ in Figure 18, but a difference appears in diagram $e$, representing the direct tensile stress subjected to the vertical edge 12, 13 and 14 by the transverse load. In diagram $e$, it is apparent that the tensile stress at points 12 and 14 will be lower than that at point 13. The combined stresses, due to the simultaneous vertical and transverse loading, are indicated in diagram $h$, from which it will be evident that the point of maximum combined stress is no longer at point 14 but is between point 14 and point 15. A considerable portion of the lower edge between point 14 and point 15 is now subjected to a higher stress that is more nearly uniform than that illustrated in diagram $h$ of Figure 18.

We see from this contrast of distribution that the square section with the rounded corners is more economical than the square section with sharp corners since it is always desirable to work as much of the metal of a section as possible at a high stressed value. It is for this reason that we employ hollow sections in truck bolsters and channel sections in truck side frames. The square section with the sharp corners is an ideal form only when subjected to non-simultaneous loads in perpendicular planes, but when the loads occur simultaneously, two opposite corners are more highly stressed than the adjacent outer edges.

It is possible to secure a section even more economical than that illustrated in Figures 18 or 19, and such a form is shown in Figure 20. In this shape, the thickness of the metal wall has been considerably increased at the mid-points of the upper and lower surfaces, thus resulting in oppositely inclined faces extending from the mid-points 11 and 15 to the corners 12, 14, 16 and 18. This results in a substantially hexagonal shaped outline. The loading $M_V$, $M_H$ is the same as Figures 18 and 19. The corners have been left sharp in order to more clearly indicate the stress distribution. In diagram $e$, however, it will be noticed that the direct tensile stress along the vertical edge is at a maximum between points 12 and 14 and drops off to a zero value at the mid-points 11 and 15. In diagram $c$, representing the direct tensile stress caused by the vertical load, the stress is at a maximum at the mid-point 15 and uniformly drops off to a somewhat lower value at the corners 14 and 16. The combined stresses for the points between the opposite corners 12 and 16 is illustrated in diagram $h$, in which it will be apparent that the stress is at a maximum along the entire edge between points 14 and 15. The taper between points 14 and 15 has been made such as to give the combined stresses a uniform value for a transverse bending action equal to 25% of the vertical bending moment, the point 14 being located at one-fourth the vertical distance between the lower mid-point 15 and a horizontal line 13, 17 through the center of the section.

In order to secure a section of a hexagonal shape in which the exterior edge of one of the lower sloping surfaces is stressed to a substantially uniform maximum value when subjected to simultaneous loadings in which the horizontal load is 25% of the vertical load and at the same time to obtain a practicable outline from a manufacturing standpoint, the corners of hexagonal shape of Figure 20 may be rounded, as shown in Figure 21. The rounded corners result in similar advantages as before described with reference to to Figure 19 in that the corner point 14 is no longer a point of maximum stress. Diagram *h* in Figure 21 illustrates the combined stresses from point 12 to point 16. It will be noted that a maximum tensile stress is substantially uniform from point 15, which is the lower mid-point of the section, to a point adjacent to but not quite up to the corner point 14. The theoretical design of bolster section, as shown in Figure 21, may be adapted to a practicable design of bolster, which is illustrated in Figures 1 to 7 and as especially shown in the cross section at the center of the bolster shown in Figure 4. The metal thickness of the walls of the box-shaped bolster section may be made such as to provide sufficient strength and at the same time utilize a minimum weight of material. The bolster design shown in Figures 1 to 7 will be more fully described and its advantages pointed out hereinafter.

Proceeding further with the theory of design, it is obvious that a change in the assumed ratio of the horizontal load to the vertical load on the respective bending movement, due to the load, will result in altering somewhat the exterior outline of the theoretical section which is most satisfactory and especially in changing the slope of the upper and lower inclined surfaces. For example, if the horizontal load is assumed to be equal to 50% of the vertical load, the slope of the inclined surfaces will be greater and the corner points 14 and 16 will be half way between the lower mid-point 15 and the center of the section, as illustrated in Figure 22. In this figure, diagram *h* indicates that the maximum tensile stress will be uniform from point 15 to point 14 and the corner points 12 and 16 will be subjected to zero stress since the neutral axis will run through these points. From this theoretical design, a practicable bolster design could be worked out in the same manner as the bolster illustrated in Figures 1 to 7 developed from Figure 21.

It will no doubt be readily understood from the discussion of the theory, as thus far described, that if the assumed horizontal load is equal to the vertical load, the theoretical section will become a square which is so placed that the loads are transmitted through the diagonals of the square, as shown in Figure 23. The stress diagrams *b*, *e*, *f* and *c*, *d*, *g*, have been drawn in accordance with the previous stress diagrams. In addition the stress diagrams *b'*, *e'* and *f'* illustrate the single stresses, due to the individual loads and the combined values thereof, between points 17, 11 and 13 of the theoretical section, that is along the exterior edges of the upper surfaces of the section, whereas, diagrams *c'*, *d'* and *g'* similarly illustrate the stresses on the left faces of the section.

Figure 24 illustrates the same square section and the diagrams $h^1$, $h^2$, $h^3$ and $h^4$ show the combined stress values on the four faces of the section. Thus diagram $h^1$ shows that the stress at point 11 is a maximum value in tension and diminishes to zero at point 12, which is on the neutral axis and then increases to a maximum value in compression at point 13. The edge 13, 14, 15 is a uniform maximum tensile stress.

For comparison with the previous theoretical sections Figure 25 shows the stress diagrams for a cylindrical section in which the horizontal load is equal to the vertical load.

Figures 1 to 10 illustrate a bolster that has been designed in accordance with the above theory and its coacting body center plate and spring plank. The bolster has been designed for assumed transverse load equal to 25% of the vertical load.

30 illustrates generally the top compression member which extends unbrokenly between the two ends of the bolster, except for the opening 31 which admits the pin of the body center plate. The compression member 30 is oppositely tapered from the longitudinal center line to form the inclined faces 32, 33. The lower tension member 34 corresponds closely in design to the upper compression member and is formed with inclined faces 35 and 36. It will be noted that the faces 32 and 33 on the compression member and the faces 35 and 36 on the tension member oppositely slope away from the longitudinal center line of the bolster towards the vertical side walls of the bolster. Since the end portions of the bolster have substantially flat top and bottom faces as indicated by the sectional view of Figure 7, the inclined faces 32 and 33 have decreasing angles of slope towards the end portions of the bolster to merge smoothly into the flat top and bottom faces at the ends. The compression member and the tension member are joined by the vertical side walls 37 and 38. The corners are considerably rounded, as indicated at 39. The center portion of the upper compression member 30 is formed in a conical shape for the center bearing 40. The metal surrounding the pivot opening 31 is inwardly flanged to form a long bearing surface 41. Strengthening ribs 42 may be cast inside of the box section in order to further strengthen the construction.

A side bearing is indicated at 43 and cooperates with the bearing 44 which may be secured to the body bolster. 45—45 are guides formed on the ends of the bolster to receive the side frame. Core openings 46 may be formed in the side members 37 and 38 in order to support the inner core pieces.

It will be apparent that a bolster of the form disclosed may be cast lying on its side instead of in a vertical position, as is customary. The sloping surfaces of the upper and lower members 30 and 34 make it very easy to withdraw the casting from the mold. The depth of the bolster is at the maximum at the center section illustrated in Figure 4, and at this point is somewhat greater than the width of the bolster. The depth decreases toward the ends of the bolster, and at the section illustrated in Figure 5, the depth is substantially equal to the width. At the ends of the bolster, the upper and lower members are flattened out, as will be apparent from the section shown in Figure 7, and the bolster becomes eight-sided in section.

The conical center bearing 40 cooperates with a body center plate of the form illustrated in Figures 8, 9 and 10. The body center plate is designated 47 and includes a flat plate portion 48 which is fastened to the body bolster by bolts extending through the openings 49. The center portion of the center plate is depressed to form a conical portion, indicated at 50, and a king pin 51 depends from the center of the plate. Suitable strengthening ribs 52 may be provided on the upper surface of the body center plate.

By this design, it is possible to reduce the customary depth required in the body center plate, and it is therefore possible to use a bolster with a greater depth at the center section, and therefore of greater strength. Spherical center bearings have been used but the conical center bearing is more desirable since it reduces the side rocking of the car body.

Figures 14 to 17, inclusive, illustrate the manner of constructing a spring plank for association with the improved bolster. A plan view of the spring plank 53 is illustrated in Figure 14. The spring plank 53 has upwardly extending side flanges 54 forming a substantial channel shaped section. An elliptical opening 55 is formed in the center portion of the spring plank to receive the lowermost center portion of the bolster. Portions of the spring plank 53 surrounding the elliptical opening 55 may be downwardly flanged, as indicated at 56 in Figure 16, to strengthen the plank. The dotted lines in Figures 15 and 16 illustrate the ordinary flat bottom bolster while the sloping full lines illustrate the outline of the improved design of bolster from which it will be apparent that a bolster of greater depth at the center portion may be employed.

I claim:

1. A truck bolster having a hexagonal center section substantially symmetrical about vertical and horizontal axes through the center of the section.

2. A truck bolster box type in section including an upper compression member, a lower tension member and substantially vertical side walls, the outer faces of said tension and compression members sloping towards the side walls away from the longitudinal center line of the bolster, the angle of the sloping faces decreasing from the center of the bolster towards the ends thereof.

3. A truck bolster box-shaped in section including an upper compression member, a lower tension member and substantially vertical side walls, the width of said bolster increasing from the center longitudinally towards the ends, the depth of said bolster decreasing from the center towards the ends and the depth of said bolster decreasing transversely from the longitudinal center line towards the side walls.

4. A truck bolster box-shaped in section including an upper compression member and a lower tension member, substantially vertical side walls, the outer faces of the upper and lower members being designed to slope away from the longitudinal center line towards the side walls, the angle of slope decreasing from the center towards the ends of the bolster and the depth of the bolster along the center line decreasing from the center towards the ends.

5. A truck bolster, box-shaped in section including a substantially unbroken top wall and vertical side walls, said side walls having core receiving openings therein, the top wall including substantially flat faces sloping downwardly away from the longitudinal center line of the bolster towards the side walls.

6. A truck bolster, box-shaped in section including a substantially unbroken top wall and vertical side walls, said side walls having core receiving openings therein, said top wall including substantially flat faces sloping downwardly away from the longitudinal center line of the bolster towards the side walls, and said top wall having throughout the greater portion of the length of the bolster a decreasing metal thickness from the longitudinal center line of the bolster towards the side walls thereof.

7. A truck bolster, box-shaped in section including an upper compression member, a lower tension member and vertical side walls, said side walls having core receiving openings therein, said compression and tension members including substantially flat faces sloping away from the longitudinal center line of the bolster towards the side walls thereof and said compression and tension members having a decreasing metal thickness from the longitudinal center line of the bolster towards the side walls thereof throughout the greater portion of the length of the bolster.

8. A truck bolster, box-shaped in section throughout its length, including top and bottom walls and vertical side walls, said side walls having code receiving openings therein, said bolster having a decreasing depth from the center towards the ends, a conical center plate bearing on the top wall of said bolster, spaced guide ribs on the side walls at the end portions of the bolster, said end portions having substantially flat top and bottom faces and said top and bottom walls between the end portions of said bolster including flat faces oppositely sloping from the longitudinal center line of the bolster towards the side walls thereof.

GEORGE S. CHILES.